United States Patent
Bechtold et al.

(10) Patent No.: US 8,002,334 B2
(45) Date of Patent: Aug. 23, 2011

(54) SERVICE PANEL FOR A MOTOR VEHICLE

(75) Inventors: Ralf-Dieter Bechtold, Weinolsheim (DE); Uwe Wawers, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 12/101,442

(22) Filed: Apr. 11, 2008

(65) Prior Publication Data

US 2008/0252103 A1 Oct. 16, 2008

(30) Foreign Application Priority Data

Apr. 12, 2007 (DE) .......................... 10 2007 017 168

(51) Int. Cl.
*B60S 1/04* (2006.01)
(52) U.S. Cl. ....................................................... 296/192
(58) Field of Classification Search .................. 296/192, 296/187.01, 187.09
See application file for complete search history.

(56) References Cited

U.S. PATENT DOCUMENTS

| | | | | |
|---|---|---|---|---|
| 3,596,978 | A * | 8/1971 | Wessells et al. | 296/203.02 |
| 4,955,662 | A | 9/1990 | Kudo | |
| 5,411,311 | A * | 5/1995 | Shimmell et al. | 296/203.02 |
| 5,692,798 | A * | 12/1997 | Wehner et al. | 296/203.01 |
| 6,398,202 | B1 * | 6/2002 | Schaible | 267/220 |
| 6,565,148 | B1 * | 5/2003 | Teramoto et al. | 296/192 |
| 6,921,126 | B2 * | 7/2005 | Suh et al. | 296/192 |
| 7,328,909 | B2 * | 2/2008 | Takayanagi et al. | 280/124.106 |
| 7,390,047 | B2 * | 6/2008 | Hanakawa et al. | 296/70 |
| 7,404,596 | B2 * | 7/2008 | Miyata et al. | 296/203.02 |
| 2002/0130553 | A1 * | 9/2002 | Kimura | 307/10.1 |
| 2003/0085591 | A1 | 5/2003 | Seksaria et al. | |
| 2005/0067858 | A1 | 3/2005 | Suh et al. | |
| 2005/0067859 | A1 | 3/2005 | Yoshii et al. | |
| 2007/0132280 | A1 | 6/2007 | Wolf | |
| 2007/0246971 | A1 * | 10/2007 | Hanakawa et al. | 296/203.01 |
| 2008/0252103 | A1 * | 10/2008 | Bechtold et al. | 296/192 |

FOREIGN PATENT DOCUMENTS

| | | |
|---|---|---|
| DE | 4110553 A1 | 10/1992 |
| DE | 10360498 A1 | 5/2005 |
| DE | 102004011523 A1 | 10/2005 |
| DE | 102004049034 A1 | 4/2006 |
| EP | 1518780 A1 | 3/2005 |
| JP | 2004262290 A | 9/2004 |
| WO | 2005032866 A1 | 4/2005 |

OTHER PUBLICATIONS

German Search Report dated Feb. 15, 2008, issued in Application No. 10 2007 017 168.6.
European Search Report dated Jun. 15, 2009, issued in Application No. 08007264.8.

* cited by examiner

*Primary Examiner* — Kiran B. Patel
(74) *Attorney, Agent, or Firm* — Ingrassia Fisher & Lorenz, P.C.

(57) ABSTRACT

A service panel is provided for a motor vehicle that is designed for closing an opening between an apron and a hood and for being mounted on the suspension strut top mountings of the motor vehicle. The service panel is equipped with an integrated strut top mounting brace. A motor vehicle is also provided with an apron for separating a passenger compartment from an engine compartment and a service panel designed for closing an opening between an apron and a hood and for being mounted on the suspension strut top mountings of the motor vehicle. The service panel is equipped with an integrated strut top mounting brace.

17 Claims, 4 Drawing Sheets

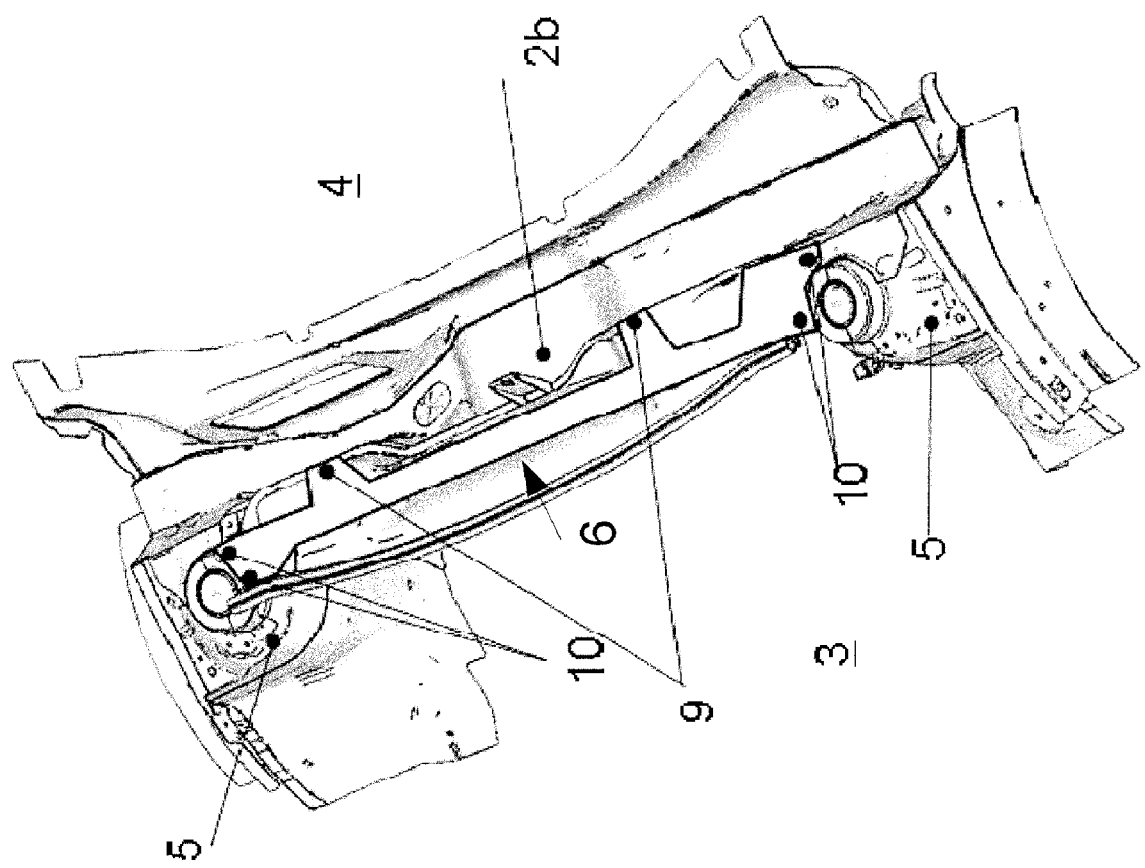

SERVICE PANEL FOR A MOTOR VEHICLE

CROSS-REFERENCE TO RELATED APPLICATION

This application claims priority to German Patent Application No. 102007017168.6, filed Apr. 12, 2007, which is incorporated herein by reference in its entirety.

TECHNICAL FIELD

The invention pertains to a service panel for a motor vehicle, particularly a passenger car, into which a strut top mounting brace is integrated. The invention furthermore pertains to a motor vehicle with a service panel of this type.

BACKGROUND

In a motor vehicle, the engine compartment is separated from the passenger compartment by an apron. In an upper region that is referred to as the upper apron below, the apron partially protrudes forward or in the longitudinal direction of the vehicle or the x-direction. This forwardly protruding section of the upper apron is referred to as the upper front apron below and together with the upper apron serves, among other things, as a mounting for various components such as, in particular, the windshield wiper modules. Since these modules are located in the gap between the hood and the windshield, they are protected from dirt and water by an upper cover that is usually referred to as a water deflector. These modules are usually situated in a water box that is mounted on the upper apron.

In addition to its function as a mounting, the upper front apron also serves as a structural component that reinforces the motor vehicle in the lateral direction of the vehicle or the y-direction. This is the reason why the upper front apron is connected to the suspension strut top mountings.

Depending on the respective space requirement for the various components in the engine compartment, it may be necessary to cut back the upper front apron. This back cut then needs to be closed again with a so-called service panel that is sometimes also referred to as a support water deflector in order to encapsulate the water box toward the engine compartment and, e.g., to subsequently mount the windshield wiper module. Such a back cut may be necessary, for example, if the windshield extends relatively far forward. In this case, the upper front apron is eliminated as a structural component. It is known to compensate this with a strut top mounting brace that extends in the lateral direction of the vehicle and is connected to the suspension strut top mountings.

In the development of motor vehicles, it is attempted to better protect pedestrians in case of a hood impact. In order to realize this pedestrian impact protection, pertinent regulations stipulate that rigid components in the engine compartment need to be spaced apart from the hood by a certain minimum distance. If a pedestrian impacts on the hood, it can yield by a certain distance and thusly cushion the impact.

One embodiment of the invention is based on the objects of ensuring a superior pedestrian impact protection in instances, in which the upper front apron is eliminated as a structural component. Furthermore, other objects, desirable features, and characteristics will become apparent from the subsequent summary, detailed description, and the appended claims, taken in conjunction with the accompanying drawings and this background.

SUMMARY

At least one objective is attained with service panel for a motor vehicle, particularly for a passenger car, that is designed for closing an opening between an apron and a hood and for being mounted on the suspension strut top mountings of the motor vehicle. The service panel is equipped with an integrated strut top mounting brace.

A first embodiment pertains to a service panel for a motor vehicle, particularly a passenger car. The service panel is designed for closing the opening between an apron, particularly an upper front apron, and the hood and is mounted on the suspension strut top mountings of the motor vehicle. For this purpose, the service panel features an integrated strut top mounting brace.

The described solution represents a hybrid component of a service panel and a strut top mounting brace, wherein the strut top mounting brace is integrated into the service panel. The hybrid component is suitable for use in instances, in which the upper front apron is eliminated as a structural component and a strut top mounting brace would be required in accordance with the state of the art in order to laterally reinforce the motor vehicle. The described component requires less structural space in the vertical direction than a separate strut top mounting brace in combination with a service panel. Consequently, the hybrid component provides a longer deformation path for the hood in case of a pedestrian impact. This results in the desired improvement of the pedestrian impact protection.

Since the unit consisting of the strut top mounting brace and the service panel is smaller than two individual components, the design of the vehicle is simplified and a broader design freedom is achieved. For example, the described hybrid component makes it easier to realize a motor vehicle with a windshield that extends relatively far forward.

Due to the proposed hybrid component, only one component needs to be installed in the manufacture of the motor vehicle rather than two components. This accelerates the manufacture and lowers the production costs.

If the motor vehicle needs to be serviced, the hybrid component allows faster access the components mounted on the upper apron, e.g., the windshield wiper modules. For example, it is merely required to remove the hybrid component in order to replace a defective windshield wiper motor, wherein a solution according to the state of the art would make it necessary to remove two components in the form of the service panel and the strut top mounting brace. The ease of maintenance accelerates the service in this respect and results in lower costs for the customer.

In a second embodiment, the service panel consists of plastic and features a metallic strut top mounting brace with a sprayed-on plastic coating. The utilization of plastic makes it possible to achieve a low weight of the service panel, wherein metal as the material for the strut top mounting brace provides the required lateral reinforcement. The technical realization of the hybrid component manufacture by means of injection molding simplifies the design of a service panel with optimal lateral reinforcement properties that simultaneously serves for closing the opening between the hood and the apron. In addition, the shape can be largely chosen arbitrarily and the components can be arranged in the region of the engine as desired.

In a third embodiment, the ends of the strut top mounting brace feature brackets for being mounted on the suspension strut top mountings. The brackets make it possible to screw the strut top mounting brace to both suspension strut top mountings in order to ensure the connection to the remaining car body.

An improved connection of the service panel to the remainder of the car body is achieved with one additional embodiment due to the fact that its strut top mounting brace is equipped with mounting points for being connected to an apron of the motor vehicle. The mounting points may be realized in the form of exposed flanges, by means of which the strut top mounting brace is screwed to the apron.

A second aspect of the invention pertains to a motor vehicle, particularly a passenger car. This passenger car features an apron for separating the passenger compartment from an engine compartment and a service panel according to one of the above-described embodiments that is mounted on two suspension strut top mountings.

According to one embodiment of the motor vehicle, an optimal lateral reinforcement is achieved with the strut top mounting brace of the service panel if the strut top mounting brace is situated in the force flow, wherein this is achieved in good approximation if the strut top mounting brace is situated between the suspension strut top mountings.

BRIEF DESCRIPTION OF THE DRAWINGS

The present invention will hereinafter be described in conjunction with the following drawing figures, wherein like numerals denote like elements.

FIG. 4 shows a detailed perspective representation of other connecting options.

DETAILED DESCRIPTION

The following detailed description is merely exemplary in nature and is not intended to limit the invention or the application and uses of the invention. Furthermore, there is no intention to be bound by any theory presented in the preceding summary, background or the following detailed description.

Figure 1:
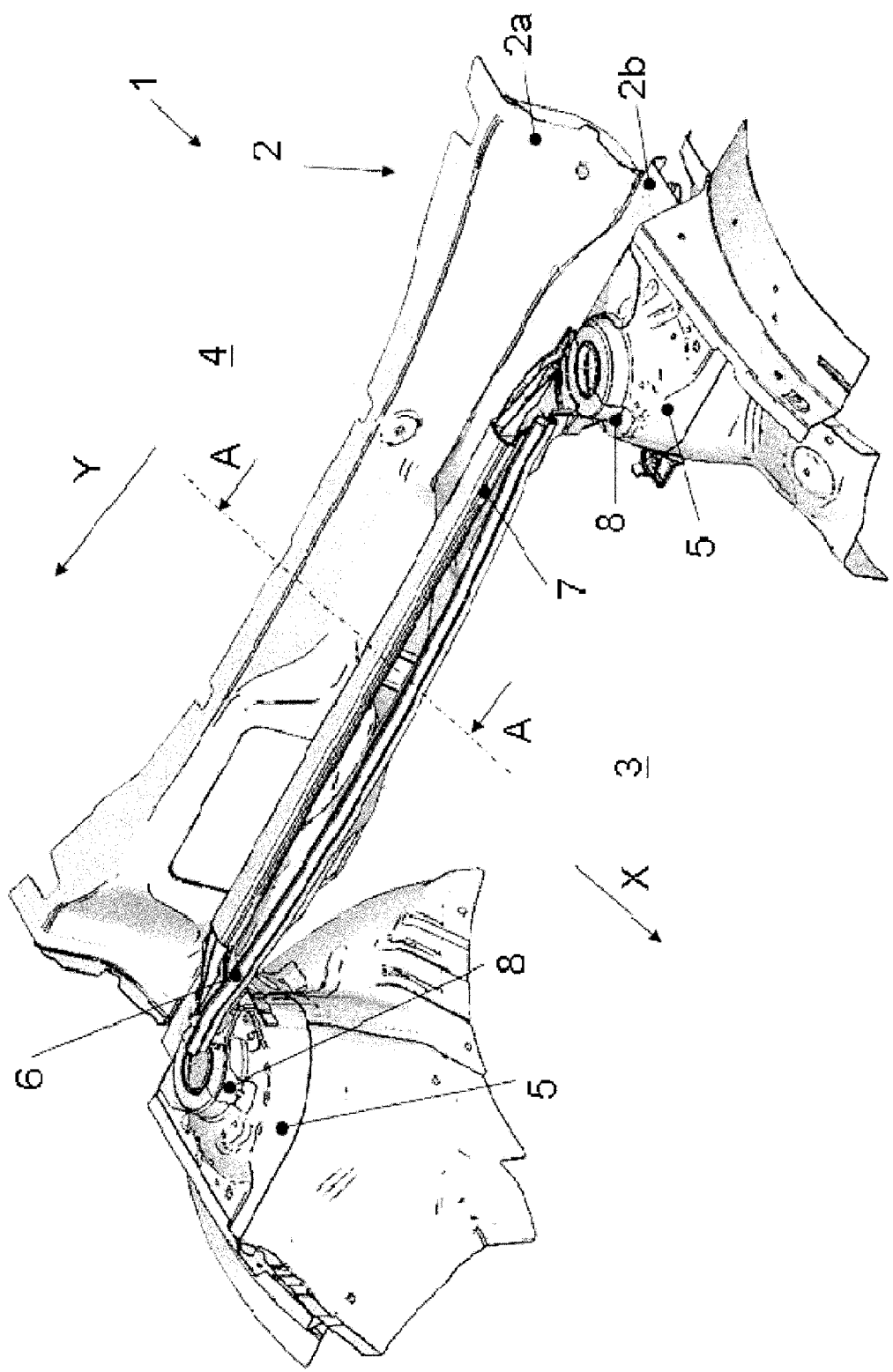
FIG. 1 shows a perspective side view of the apron region of a passenger car.

FIG. 1 shows a section of a motor vehicle 1 with an apron 2. The apron 2 comprises an upper apron 2a and an upper front apron 2b. The arrow identified by the reference symbol "X" indicates the longitudinal direction of the vehicle. The apron 2 separates the engine compartment 3 from the passenger compartment 4. The upper front apron 2b is cut back and therefore eliminated as a structural component for reinforcing the motor vehicle 1 in the y-direction or the lateral direction of the vehicle. The latter-mentioned direction is indicated with an arrow identified by the reference symbol "Y."

The service panel 6 is situated between the two suspension strut top mountings 5. A strut top mounting brace 7 is integrated into the service panel 6. The service panel 6 with the integrated strut top mounting brace 7 is mounted on the suspension strut top mountings 5 with the aid of brackets 8.

Figure 2:
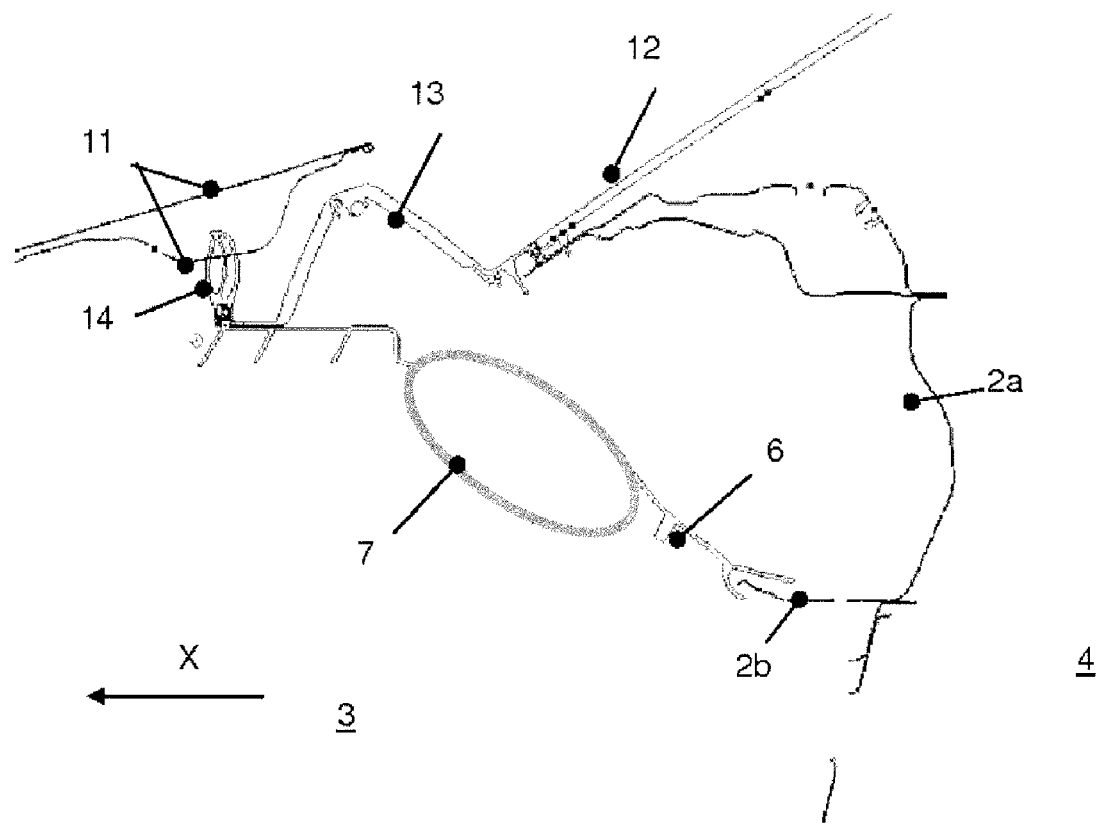
FIG. 2 shows a section through FIG. 1 along the line A-A.

FIG. 2 shows a section A-A through FIG. 1 viewed in the direction indicated by an arrow, i.e., in the y-direction. This figure shows the upper apron 2a with the upper front apron 2b. The service panel 6 comprises an injection-molded part and features an integrated strut top mounting brace 7 in its interior. The upper end of the service panel 6 has a hood seal 14 that serves for closing the opening between the service panel 6 and the hood 11. The region between the hood 11 and the windshield 12 is protected from the admission of water and dirt from above by a water deflector 13.

Figure 3:
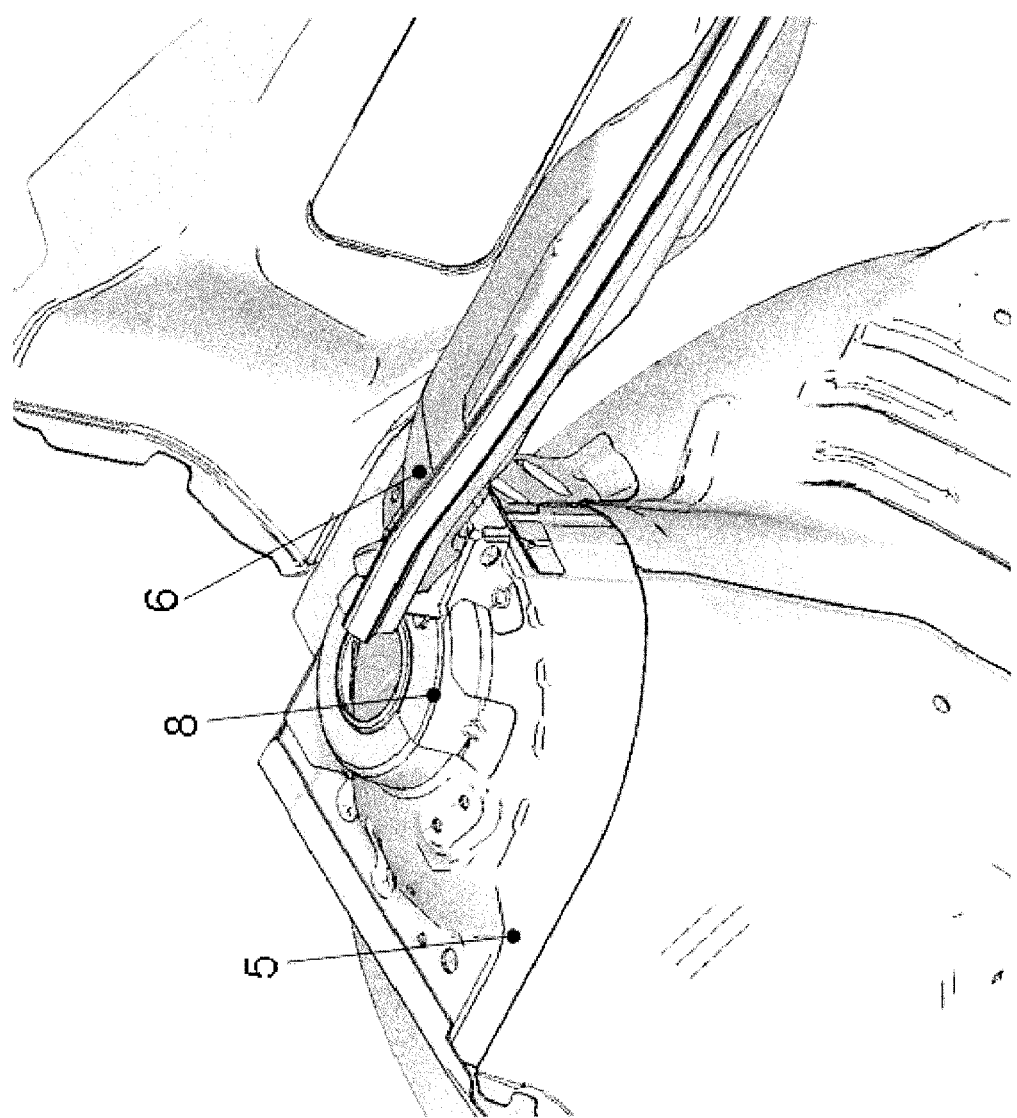
FIG. 3 shows a detailed perspective representation of the connection to the strut top mounting.

FIG. 3 shows a detailed perspective representation of the connection to the strut top mounting. This figure shows the service panel 6 with the integrated strut top mounting brace 7 and a bracket 8 of sheet metal that is screwed to the suspension strut top mounting 5.

FIG. 4 shows a detailed perspective representation of a screw connection 10 that serves for mounting the service panel 6 on the suspension strut top mounting 5, as well as another screw connection 9 for connecting the service panel to the upper front apron 2b. In this case, the number of screw points as variable.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A panel assembly for a motor vehicle having an apron, a hood, and a plurality of strut top mountings, the panel assembly comprising:
   a service panel configured to close an opening between the apron and the hood; and
   a brace integrated into the service panel, the brace being configured for attachment to the plurality of strut top mountings.

2. The panel assembly of claim 1, wherein the brace includes a first end and a second end and wherein the first end and the second end include a first strut top mounting bracket and a second strut top mounting bracket, respectively, and wherein the first and the second strut top mounting brackets are configured to enable attachment of the brace to the strut top mountings.

3. The panel assembly of claim 2, wherein the first and the second strut top mounting brackets are each configured to conform to a contour of at least a portion of a respective strut top mounting of the plurality of strut top mountings.

4. The panel assembly of claim 2, wherein the first and the second strut top mounting brackets are each adapted to receive a screw for attaching the brace to the plurality of strut top mountings.

5. The panel assembly of claim 2, wherein the first and the second strut top mounting brackets comprise sheet metal.

6. The panel assembly of claim 1, wherein the service panel comprises plastic.

7. The panel assembly of claim 1, wherein the brace comprises metal.

8. The panel assembly of claim 1, wherein the brace is integrated into an approximate center of the service panel.

9. A panel assembly for a motor vehicle having an apron, a hood, and a plurality of strut top mountings, the panel assembly comprising:
   a service panel configured to close an opening between the apron and the hood;
   a sealing member attached to the service panel and configured to form a seal between the service panel and the hood; and a brace integrated into the service panel, the brace being configured for attachment to the plurality of strut top mountings.

10. The panel assembly of claim 9, wherein the brace includes a first end and a second end and wherein the first end and the second end include a first strut top mounting bracket and a second strut top mounting bracket, respectively, and wherein the first and the second strut top mounting brackets are configured to enable attachment of the brace to the strut top mountings.

11. The panel assembly of claim 10, wherein the first and the second strut top mounting brackets are each configured to conform to a contour of at least a portion of a respective strut top mounting of the plurality of strut top mountings.

12. The panel assembly of claim 9, wherein the service panel comprises plastic.

13. The panel assembly of claim 9, wherein the brace comprises metal.

14. The panel assembly of claim 9, wherein the brace is integrated into an approximate center of the service panel.

15. A panel assembly for a motor vehicle having an apron, a hood, and a plurality of strut top mountings, the panel assembly comprising:
a service panel configured to close an opening between the apron and the hood, the service panel being adapted for attachment to the apron; and
a brace integrated into the service panel, the brace being configured for attachment to the plurality of strut top mountings.

16. The panel assembly of claim 15, wherein the service panel includes a plurality of mounting adaptations for attaching the service panel to the apron.

17. The panel assembly of claim 16, wherein each of the plurality of mounting adaptations comprises a flange.

* * * * *